US011983256B2

(12) United States Patent
Li

(10) Patent No.: US 11,983,256 B2
(45) Date of Patent: May 14, 2024

(54) ILLUMINATION-BASED USER AUTHENTICATION

(71) Applicants:Atlassian PTY Ltd., Sydney (AU); Atlassian US, Inc., San Francisco, CA (US)

(72) Inventor: Shuai Li, Sunnyvale, CA (US)

(73) Assignees: ATLASSIAN PTY LTD., Sydney (AU); ATLASSIAN US, INC., San Francisco, CA (US)

(*) Notice: Subject to any disclaimer, the term of this patent is extended or adjusted under 35 U.S.C. 154(b) by 208 days.

(21) Appl. No.: 17/123,933

(22) Filed: Dec. 16, 2020

(65) Prior Publication Data

US 2021/0200845 A1 Jul. 1, 2021

Related U.S. Application Data

(60) Provisional application No. 62/955,570, filed on Dec. 31, 2019.

(51) Int. Cl.
*G06F 21/32* (2013.01)
*G06F 21/31* (2013.01)
*G06V 40/16* (2022.01)

(52) U.S. Cl.
CPC ............ *G06F 21/32* (2013.01); *G06F 21/316* (2013.01); *G06V 40/161* (2022.01); *G06V 40/171* (2022.01)

(58) Field of Classification Search
CPC ..... G06F 21/32; G06F 21/316; G06V 40/171; G06V 40/161
See application file for complete search history.

(56) References Cited

U.S. PATENT DOCUMENTS

| 11,425,562 B2 * | 8/2022 | LeCun | H04N 19/70 |
| 2015/0294149 A1 * | 10/2015 | Palti-Wasserman | G06V 40/13 |
| | | | 382/124 |
| 2018/0041503 A1 * | 2/2018 | Lindemann | H04L 63/0435 |

FOREIGN PATENT DOCUMENTS

| CA | 3031771 A1 * | 2/2018 | ............. A61B 3/113 |
| CN | 103946732 B * | 6/2019 | ......... G02B 27/0093 |

(Continued)

OTHER PUBLICATIONS

WO 2019007746 A1—Process Control With Colour Sensor, Jan. 10, 2019, Clarivate Analytics (Year: 2019).*

(Continued)

*Primary Examiner* — Richard A McCoy
(74) *Attorney, Agent, or Firm* — Alston & Bird LLP

(57) ABSTRACT

Systems and methods provide techniques for illumination-based user authentication. In one embodiments, a method includes at least operations configured to receive a user authentication request for a computing device, and in response to receiving the user authentication request, cause a display device of the computing device to display a display pattern during a first time period; determine, based on image sensor data received from an image sensor device of the computing device, a responsive facial state during the first time period; determine a responsive correlation score for the display pattern and the responsive facial state, wherein the reflective correlation score is an estimated likelihood that that the responsive facial state indicates an authenticated end-user observing the display pattern; and determine whether to grant the user authentication request based on one or more authentication indicators, wherein the one or more authentication indicators comprise the responsive correlation score.

20 Claims, 13 Drawing Sheets

(56) References Cited

FOREIGN PATENT DOCUMENTS

| JP | 2004318501 | A | * | 11/2004 | | |
|----|------------|----|---|---------|---|---|
| JP | 2005327161 | A | * | 11/2005 | | |
| JP | 3984191 | B2 | * | 10/2007 | | |
| JP | 4177629 | B2 | * | 11/2008 | | |
| TW | 201727467 | A | * | 8/2017 | ............. | G06F 21/32 |
| WO | WO-2019007746 | A1 | * | 1/2019 | | |

OTHER PUBLICATIONS

Borza, D.; Darabant, A.S.; Danescu, R. Real-Time Detection and Measurement of Eye Features from Color Images. Sensors 2016, 16, 1105. https://doi.org/10.3390/s16071105 see also https://www.mdpi.com/148268 (Year: 2016).*

* cited by examiner

ILLUMINATION-BASED USER AUTHENTICATION

BACKGROUND

Various methods, apparatuses, and systems are configured to provide techniques for user authentication. Applicant has identified many deficiencies and problems associated with existing methods, apparatuses, and systems for user authentication. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable illumination-based user authentication. For example, certain embodiments of the present invention provide methods, apparatuses, systems, computing devices, and/or the like that are configured to enable illumination-based user authentication using at least one of display patterns, responsive facial states, responsive correlation states, responsive behavioral profiles, lip synchronization states, and lip synchronization behavioral profiles.

In accordance with one aspect, a method is provided. In one embodiment, the method comprises: receiving a user authentication request for a computing device, and in response to receiving the user authentication request, causing a display device of the computing device to display a display pattern during a first time period; determining, based on image sensor data received from an image sensor device of the computing device, a responsive facial state during the first time period; determining a responsive correlation score for the display pattern and the responsive facial state, wherein the reflective correlation score is an estimated likelihood that that the responsive facial state indicates an authenticated end-user observing the display pattern; and determining whether to grant the user authentication request based on one or more authentication indicators, wherein the one or more authentication indicators comprise the responsive correlation score.

In accordance with another aspect, a computer program product is provided. The computer program product may comprise at least one computer-readable storage medium having computer-readable program code portions stored therein, the computer-readable program code portions comprising executable portions configured to: receive a user authentication request for a computing device, and in response to receiving the user authentication request, cause a display device of the computing device to display a display pattern during a first time period; determine, based on image sensor data received from an image sensor device of the computing device, a responsive facial state during the first time period; determine a responsive correlation score for the display pattern and the responsive facial state, wherein the reflective correlation score is an estimated likelihood that that the responsive facial state indicates an authenticated end-user observing the display pattern; and determine whether to grant the user authentication request based on one or more authentication indicators, wherein the one or more authentication indicators comprise the responsive correlation score.

In accordance with yet another aspect, an apparatus comprising at least one processor and at least one memory including computer program code is provided. In one embodiment, the at least one memory and the computer program code may be configured to, with the processor, cause the apparatus to: receive a user authentication request for a computing device, and in response to receiving the user authentication request, cause a display device of the computing device to display a display pattern during a first time period; determine, based on image sensor data received from an image sensor device of the computing device, a responsive facial state during the first time period; determine a responsive correlation score for the display pattern and the responsive facial state, wherein the reflective correlation score is an estimated likelihood that that the responsive facial state indicates an authenticated end-user observing the display pattern; and determine whether to grant the user authentication request based on one or more authentication indicators, wherein the one or more authentication indicators comprise the responsive correlation score.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 7:
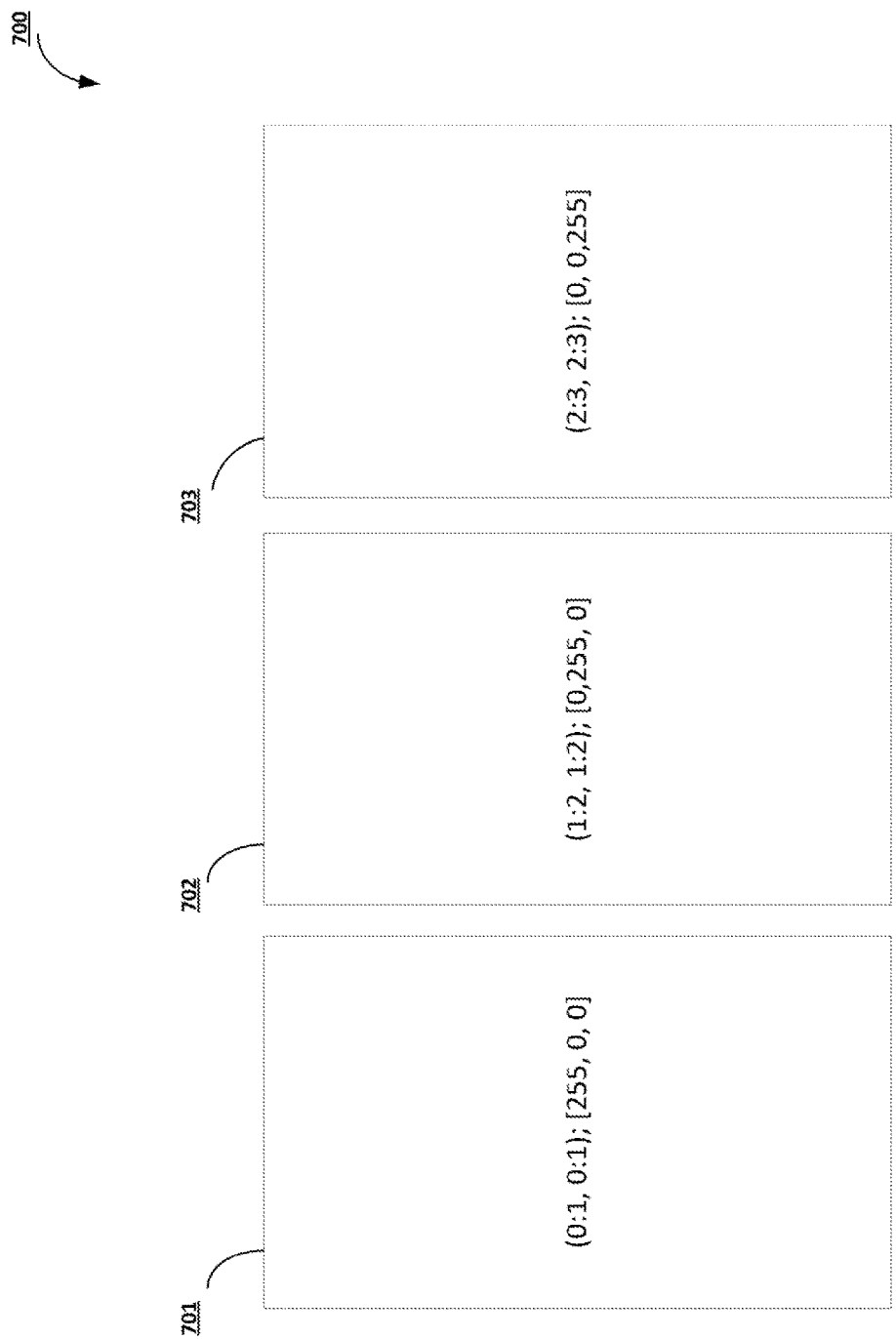

FIG. 7 provides an operational example of a display pattern in accordance with at least some embodiments of the present invention.

Figure 8:
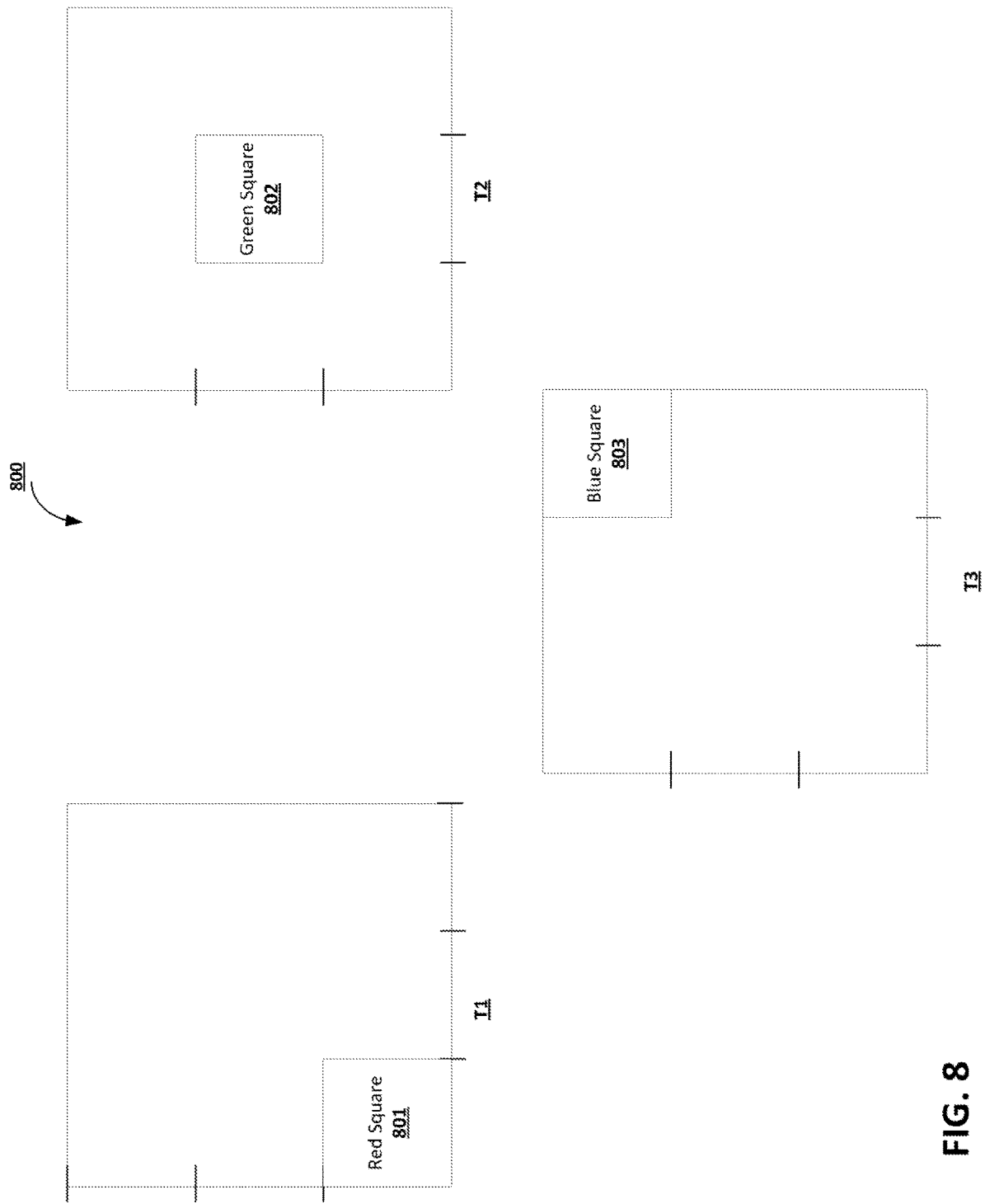

FIG. 8 provides an operational example of a display output generated based on a display pattern in accordance with at least some embodiments of the present invention.

Figure 9:
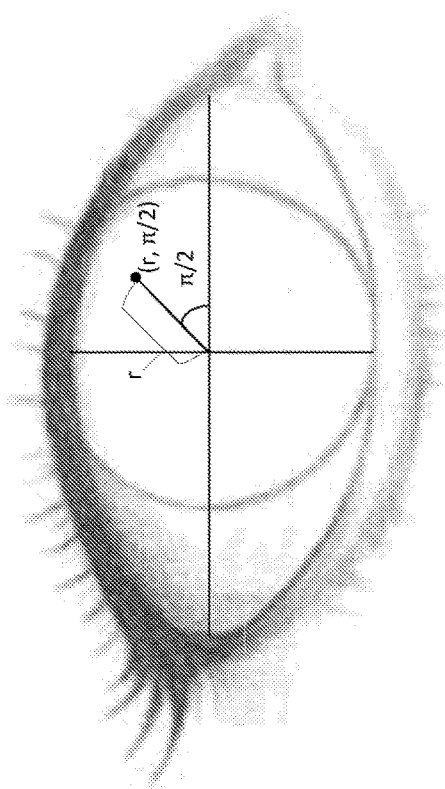

FIG. 9 provides an operational example of a vision-based responsive facial state in accordance with at least some embodiments of the present invention.

Figure 10:
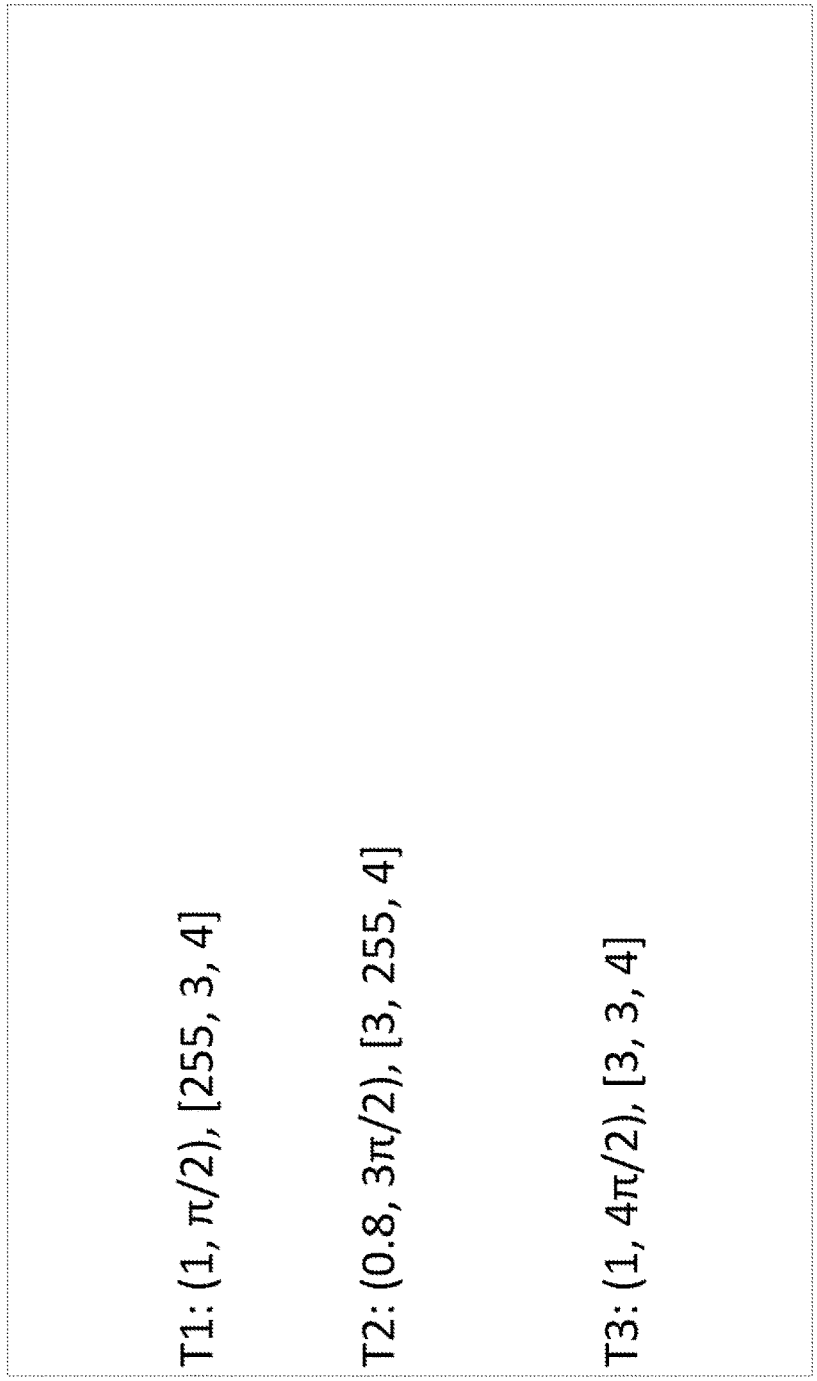

FIG. 10 provides an operational example of an eyeball positioning modeling data object in accordance with at least some embodiments of the present invention.

Figure 11:
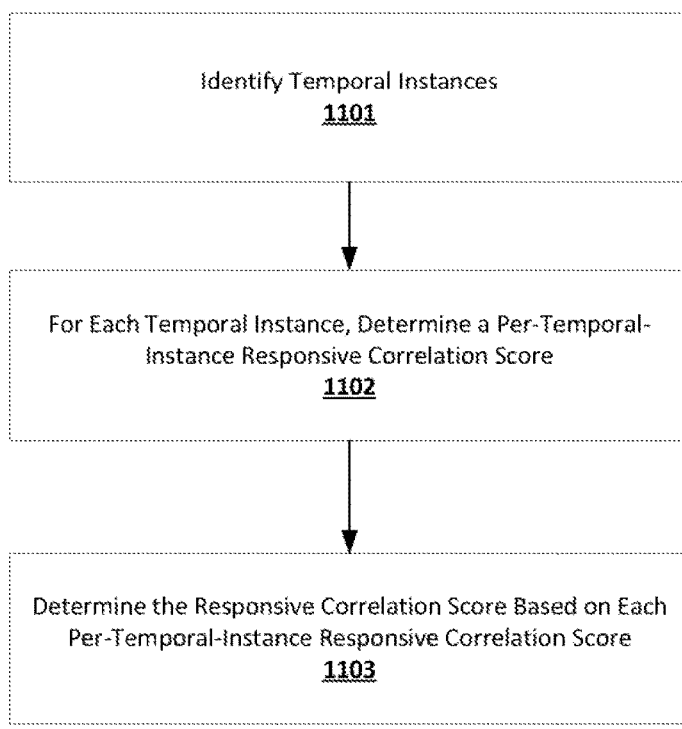

FIG. 11 is a flowchart diagram of an example process for determining a responsive correlation score in accordance with at least some embodiments of the present invention.

Figure 12:
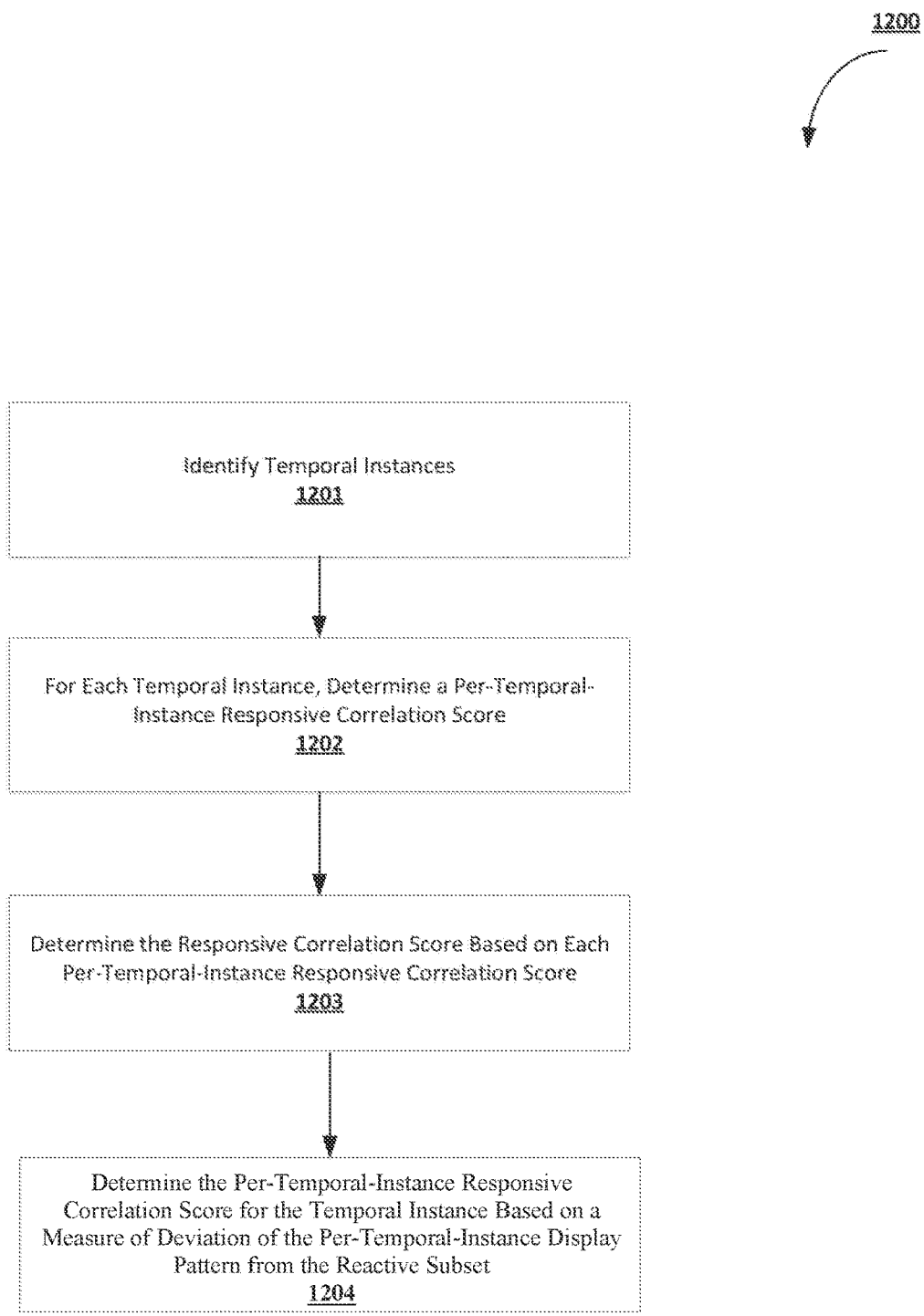

FIG. 12 is a flowchart diagram of an example process for determining a per-temporal-instance responsive correlation score in accordance with at least some embodiments of the present invention.

Figure 13:
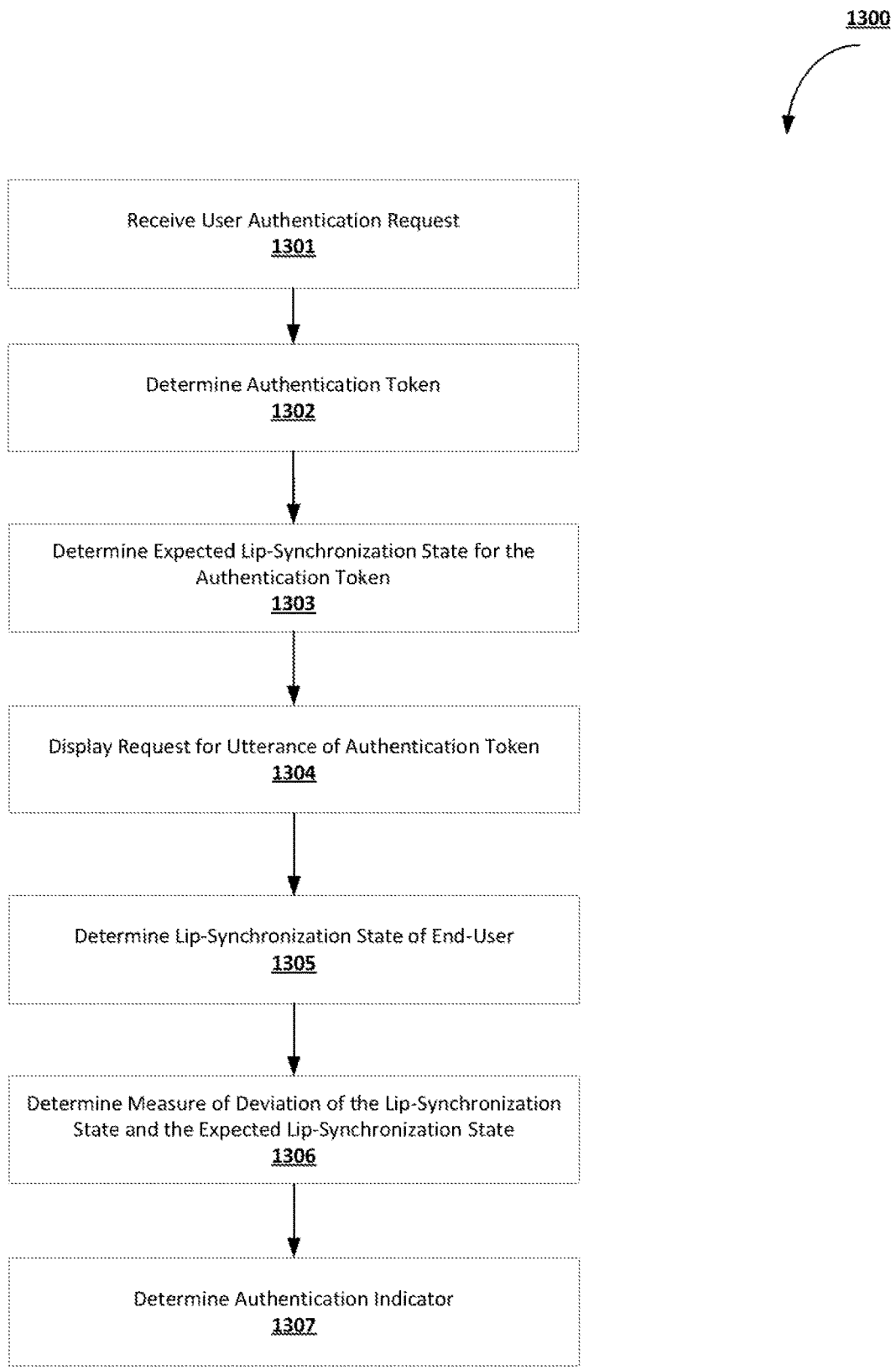

FIG. 13 is a flowchart diagram of an example process for performing lip-synchronization-based user authentication in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention increase efficiency and reliability of user authentication systems by enabling computationally efficient and security-focused reliable counter-spoofing techniques. One of the primary challenges facing conventional user authentication systems relates to the ability of remote, intruder systems to masquerade themselves as legitimate users of those computing devices. The noted spoofing challenges have proved especially daunting for many facial recognition user authentication systems. In a facial recognition user authentication system, the intruder system may be able to penetrate the system and defeat its user authentication safeguards by using pre-generated images of a legitimate end-user, which may be readily available on social media platforms or through other means. Thus, there is continuing need for efficient and reliable counter-spoofing techniques in user authentication systems, including user authentication systems that utilize facial recognition techniques.

To address the above-described spoofing challenges of many conventional user authentication systems, various embodiments of the present invention describe techniques for performing illumination-based user authentication. For example, various embodiments of the present invention utilize data describing at least one of a reflection of a runtime-generated display pattern on a real-world physical entity (e.g., a real-world bodily entity such as a user's face or eyes) and a reaction of a recorded end-user to a run-time generated display pattern as predictive signals that can be used to predict whether a user authentication request originates from an authentic end user of a computing device or is otherwise a spoofed request. By utilizing illumination-based user authentication, various embodiments, of the present invention enable utilizing real-world illumination-based reflections of and end-user reactions to run-time generated display patterns in order to perform user authentication. Because the noted embodiments integrate real-world conditions generated by and real-world actions performed in response to dynamic outputs as authentication indicators, the mentioned embodiments provide an efficient yet powerful mechanism for defeating spoofed attempts at user authentication.

Accordingly, by utilizing various aspects via the illumination-based user authentication described herein, various embodiments of the present invention address technical challenges related to efficiency and reliability of user authentication systems. Moreover, by utilizing various aspects via the illumination-based user authentication described herein, various embodiments of the present invention increase efficiency and reliability of user authentication systems by enabling the computationally efficient and security-wise reliable counter-spoofing techniques related to illumination-based user authentication.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "illumination-based user authentication" refers to any computer-implemented process that utilizes data describing at least one of a reflection of a runtime-generated display pattern on a real-world physical entity (e.g., a real-world bodily entity) and a reaction of a recorded end-user to a run-time-generated display pattern as predictive signals that can be used to predict whether a user authentication request originates from an authentic end user of a computing device or is otherwise a spoofed request. For example, in response to a user authentication request purported to be from a first end user, an illumination-based user authentication process may utilize data describing reflection of a run-time-generated display on the face of the first end-user as a predictive signal used to determine whether the first end-user is actually interacting with a corresponding computing device at a time of the user authentication request. As another example, in response to a user authentication request purported to be from a first end user, an illumination-based user authentication process may utilize data describing eye movements of the first end-user as a predictive signal used to determine whether the first end-user is actually interacting with a corresponding computing device at a time of the user authentication request. An illumination-based user authentication process may be utilized individually or along with one or more other user authentication processes to perform user authentication in response to a user authentication request.

The term "user authentication request" refers to a data object seeking to establish that a user profile associated with the data object is authorized to access corresponding computing resources associated with a computing device in accordance with predefined access rights defined for various user profiles of the computing device. An example of a user authentication request is a login request. User authentication request may be generated in response to predefined end-user actions with reference to a computing device utilized by the corresponding end-user. In some embodiments, a user authentication request is processed locally, i.e., on the same computing device as the computing device on which the user authentication request is generated. In some other embodiments, a user authentication request is transmitted, by the computing device on which the user authentication request is generated and via one or more computer networks, to another computing device configured to process the user authentication request.

The term "display pattern" refers to a data object describing, for each temporal instance of a time period, one or more subsets of a display space of a display device (e.g., one or more subsets of the display space comprising part or all of the display device) of a computing device along with a color designation for each subset of the one or more subsets. For example, a particular display pattern may describe that, during a first temporal instance of a first time period, a first set of pixels of a display space should have a first color designation and a second set of pixels of a display space should have a second color designation, where a color designation may be defined by a coloring scheme such as a Red-Green-Blue (RGB) coloring scheme or a grayscale coloring scheme. In some embodiments, a display pattern may be generated using at least one random selection routine and/or at least one pseudo-random selection routine. For example, a particular display pattern may be generated using a first random selection routine configured to select one or more random subsets of a display space and a second random selection routine configured to select a random color designation for each randomly-selected subset of the display space. As another example, a particular display pattern may be generated using a first pseudo-random selection routine configured to select one or more pseudo-random subsets of a display space and a second pseudo-random selection routine configured to select a pseudo-random color designation for each pseudo-randomly-selected subset of the display space.

The term "image sensor device" refers to an electronic device configured to generate one or more images capturing real-world physical entities that are within a vantage point of the image sensor device. Examples of image sensor devices include cameras and other devices incorporating at least one of charge-coupled devices (CCDs) and active-pixel sensor devices.

The term "responsive facial state" refers to a data object that describes one or more illumination-based reflections on an image region estimated to include a face of an end-user and/or one or more changes in an image region estimated to include a face of an end-user. A responsive facial state may describe, for each detected illumination-based reflection on an image region estimated to include a face of an end-user, a relative location of the illumination-based reflection in relation to other detected illumination-based reflections and/or in relation to the image region as a whole. In some embodiments, determining a responsive facial state for an end-user includes receiving image sensor data associated with the end-user, detecting an image region estimated to include a face of the end-user based on the image sensor data, and detecting one or more illumination-based reflections on the detected image region. A responsive facial state may further describe one or more eye ball movements of a recorded end-user of a computing device.

The term "responsive correlation score" refers to a data object that describe an estimated likelihood that a responsive facial state indicates an authenticated end-user observing a display pattern. In some embodiments, a responsive correlation score is determined as a measure of deviation between a responsive facial state and an expected responsive facial state for a display pattern. In some embodiments, a responsive correlation score is determined as a measure of a count of illumination-based reflections described by a corresponding responsive facial state that each correlates with a color designation of a corresponding display pattern. In some embodiments, a responsive correlation score is determined as a measure of a weighted count of illumination-based reflections described by a corresponding responsive facial state that each correlates with a color designation of a corresponding display pattern, where the weight of each correlation is determined based on at least one of a size of the display space subset corresponding to a color designation associated with the correlation, a brightness of a color designation associated with the correlation, etc. In some embodiments, a responsive correlation score is determined as a measure of count of eye movements described by a corresponding responsive facial state that each correlates with a color designation of a corresponding display pattern. In some embodiments, a responsive correlation score is determined as a weighted measure of count of eye movements described by a corresponding responsive facial state that each correlates with a color designation of a corresponding display pattern, where the weight of each correlation is determined based on at least one of a size of the display space subset corresponding to a color designation associated with the correlation, a brightness of a color designation associated with the correlation, etc.

The term "authentication indicator" refers to a data object configured to describe a predictive signal that can be used, individually or along with other authentication indicators, to perform user authentication. Examples of authentication indicators include responsive correlation scores, lip synchronization correlation scores, authentication indicators generated in response to password entries, authentication indicators generated in response to finger-print scans, authentication indicators generated in response to quick response (QR) code scans, etc.

The term "display space" refers to a data object that describes a physical subdivision of a display region associated with a display device. For example, a display space may describe various pixels of a display region associated with a display device. As another example, a display space may describe various combinations of pixels of a display region associated with a display device The term "estimated reflection speed" refers to a data object that describes an estimated time between display of a color pattern on a display device and a reflection of the displayed color pattern on physical entities facing the display device. In some embodiments, the estimated reflection speed is calculated based on one or more configuration properties of the display device. In some embodiments, the estimated reflection speed is calculated based on one or more brightness properties of a physical environment of the display device.

The term "responsive time period" refers to a data object that describes an estimated time of reflection of a display pattern and/or an estimated time of reaction of an end-user to a display pattern. In some embodiments, the responsive time period of an end-user may be determined based on an average responsive behavioral profile of the end-user over time. In some embodiments, the responsive time period of an end-user may be determined based on an average responsive behavioral profile of an end-user cohort including the end-user. In some embodiments, the responsive time period of an end-user may be determined based on an average responsive behavioral profile of all end-users.

The term "responsive behavioral profile" refers to a data object that describes one or more expected properties of a physical reaction of an end-user to a display pattern. For example, a responsive behavioral profile may describe an expected speed of eye movement of an end-user in order to observe a particular display pattern. As another example, a responsive behavioral profile may describe an expected direction of eye movement of an end-user in order to observe a particular display pattern. As another example, a responsive behavioral profile may describe an expected magnitude of eye movement of an end-user in order to observe a particular display pattern.

The term "responsive facial feature" refers to a data object that describes one or more illumination-based reflections on an image region estimated to include a portion of a face of an end-user and/or one or more changes in an image region estimated to include a portion of a face of an end-user. An example of a responsive facial feature is an eye-related facial feature, which is a data object that describes one or more changes in an image region estimated to include one or both of the eyes of an end-user. For example, an eye-related facial feature may describe at least one of a direction of eye movement of an end-user, a magnitude of eye movement of an end-user, a speed of direction of eye movement of an end-user, a change in size of iris of an end-user, etc.

The term "lip synchronization state" refers to a data object that describes changes in an image region estimated to include lips of an end-user over a time period. For example, the lip synchronization state may describe at least one of a direction of lip movement of an end-user, a magnitude of lip movement of an end-user, a speed of direction of lip movement of an end-user, an acceleration of lip movement of an end-user, a speed of direction of lip movement of an end-user, an average time of pauses of an end-user, an average time of lack of movement of lips of an end-user, etc.

The term "lip synchronization correlation score" refers to a data object that describes an estimated likelihood that a lip synchronization state of an end-user indicates an expected lip synchronization state associated with a particular combination of one or more phrases (e.g., a particular combination of one or more phrases associated with an authentication token). In some embodiments, a lip synchronization correlation score is determined as a measure of deviation between a lip synchronization state and an expected lip synchronization state. In some embodiments, a lip synchronization correlation score is determined as a measure of a count of lip-region changes described by a corresponding lip synchronization state that each correlates with a lip change of an expected lip synchronization state. In some embodiments, a responsive correlation score is determined as a measure of a weighted count of lip-region changes described by a corresponding lip synchronization state that each correlates with a lip change of an expected lip synchronization state, where the weight of each correlation is determined based on at least one of a magnitude of a lip movement of the lip synchronization state associated with the correlation and a magnitude of a lip movement of the expected lip synchronization state associated with the correlation.

The term "expected lip synchronization correlation state" refers to a data object that describes expected lip movements while uttering an authentication token (e.g., a password phrase authentication token). For example, the expected lip synchronization correlation state may describe one or more of expected lip movement magnitudes while uttering an authentication token, expected lip movement directions while uttering an authentication token, expected lip movement speeds while uttering an authentication token, expected lip movement accelerations while uttering an authentication token, etc.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
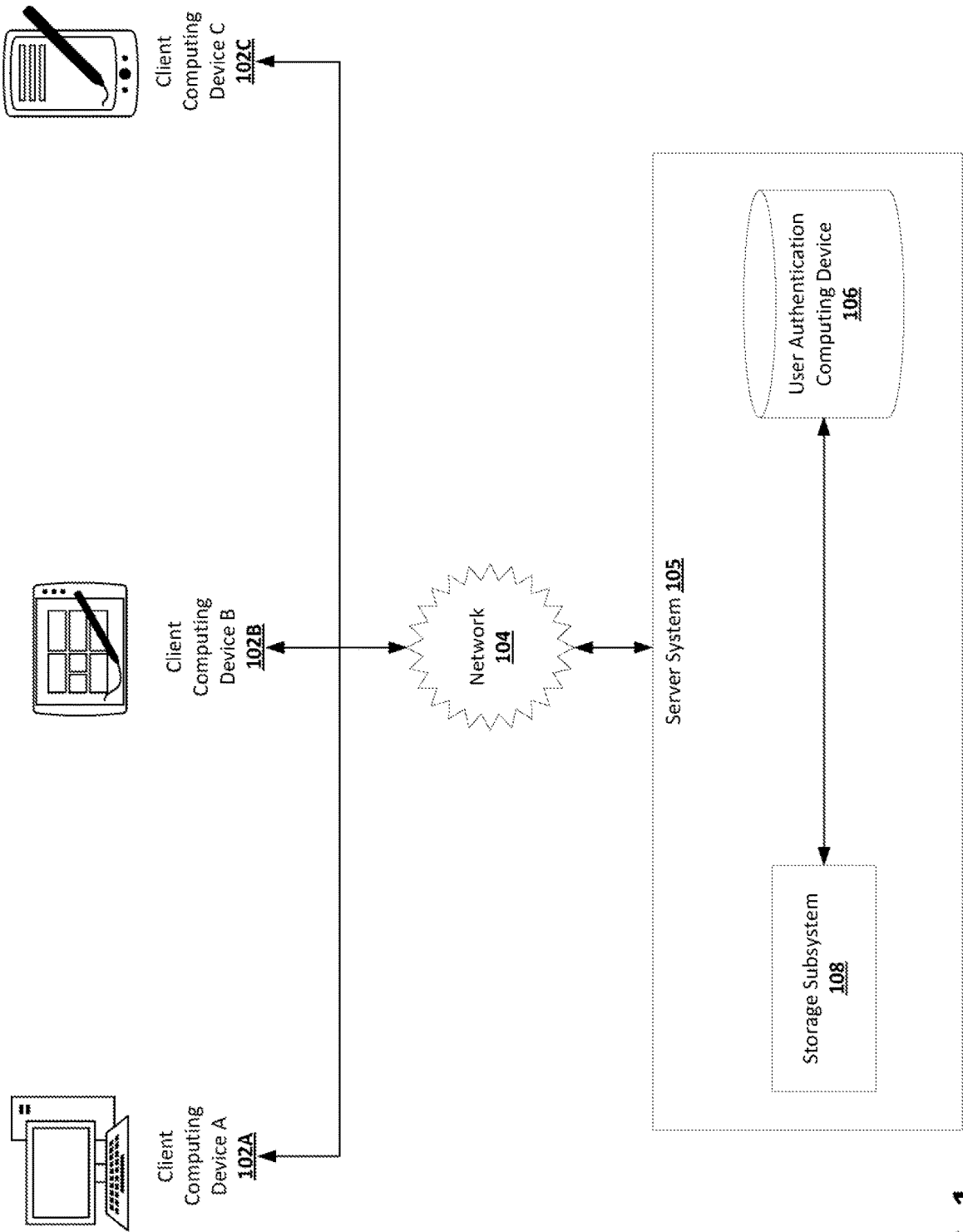
FIG. 1 is a block diagram of an example architecture within which at least some embodiments of the present invention may operate.

FIG. 1 illustrates an example system architecture 100 within which embodiments of the present invention may operate. The architecture 100 includes a server system 105 configured to interact with one or more client computing devices 102A-C, such as client computing device 102A, client computing device B 102B, and client computing device C 103. The server system 105 may enable the client computing devices 102A-C to access one or more computing resources. For example, the server system 105 may be configured to receive document retrieval requests from the client computing devices 102A-C, process the document retrieval requests to generate user interfaces that include data associated with requested documents, and provide rendering data associated with the user interfaces to the client computing devices 102A-C.

The server system 105 may communicate with the client computing devices 102A-C using a network 104. The network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 104 may include a cellular telephone, an 802.11, 802.16, 802.20, and/or WiMax network. Further, the network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the group-based communication system. In some embodiments, the protocol is a custom protocol of JavaScript Object Notation (JSON) objects sent via a Websocket channel. In some embodiments, the protocol is JSON over RPC, JSON over REST/HTTP, and the like.

The server system 105 may include a user authentication computing device 106 and a storage subsystem 108. The user authentication computing device 106 may be configured to receive user authentication requests from the client computing devices 102A-C and process the user authentication requests by determining whether to grant the noted user authentication requests. The storage subsystem 108 may be configured to store data associated with one or more computing resources access to which is controlled by the server system 105, such as data associated with one or more predictive models utilized by the user authentication computing device 106 and/or authentication routines utilized by the user authentication computing device 106.

The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary User Authentication Computing Device

Figure 2:
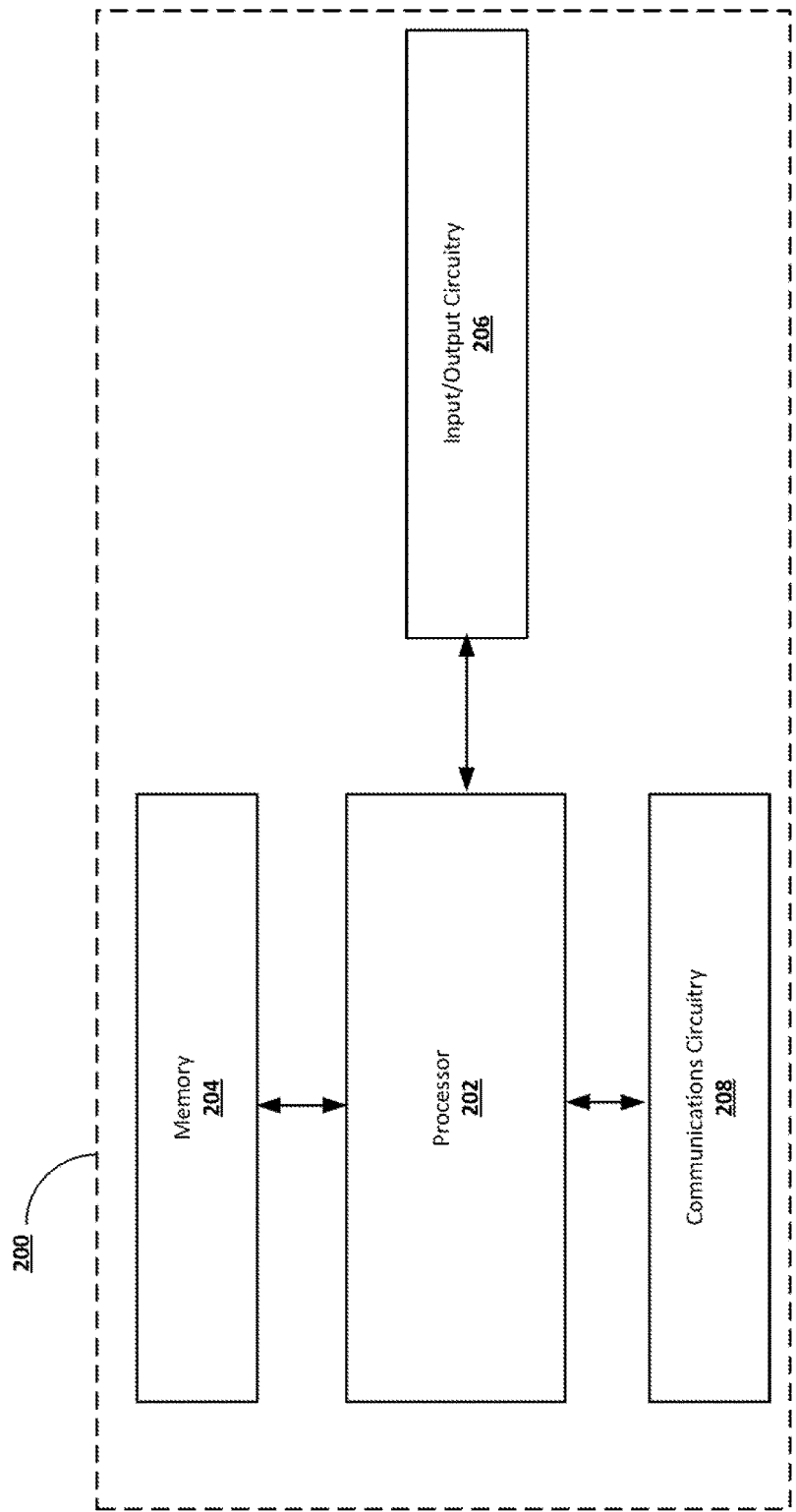
FIG. 2 is a block diagram of an example user authentication computing device in accordance with at least some embodiments of the present invention.

The user authentication computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
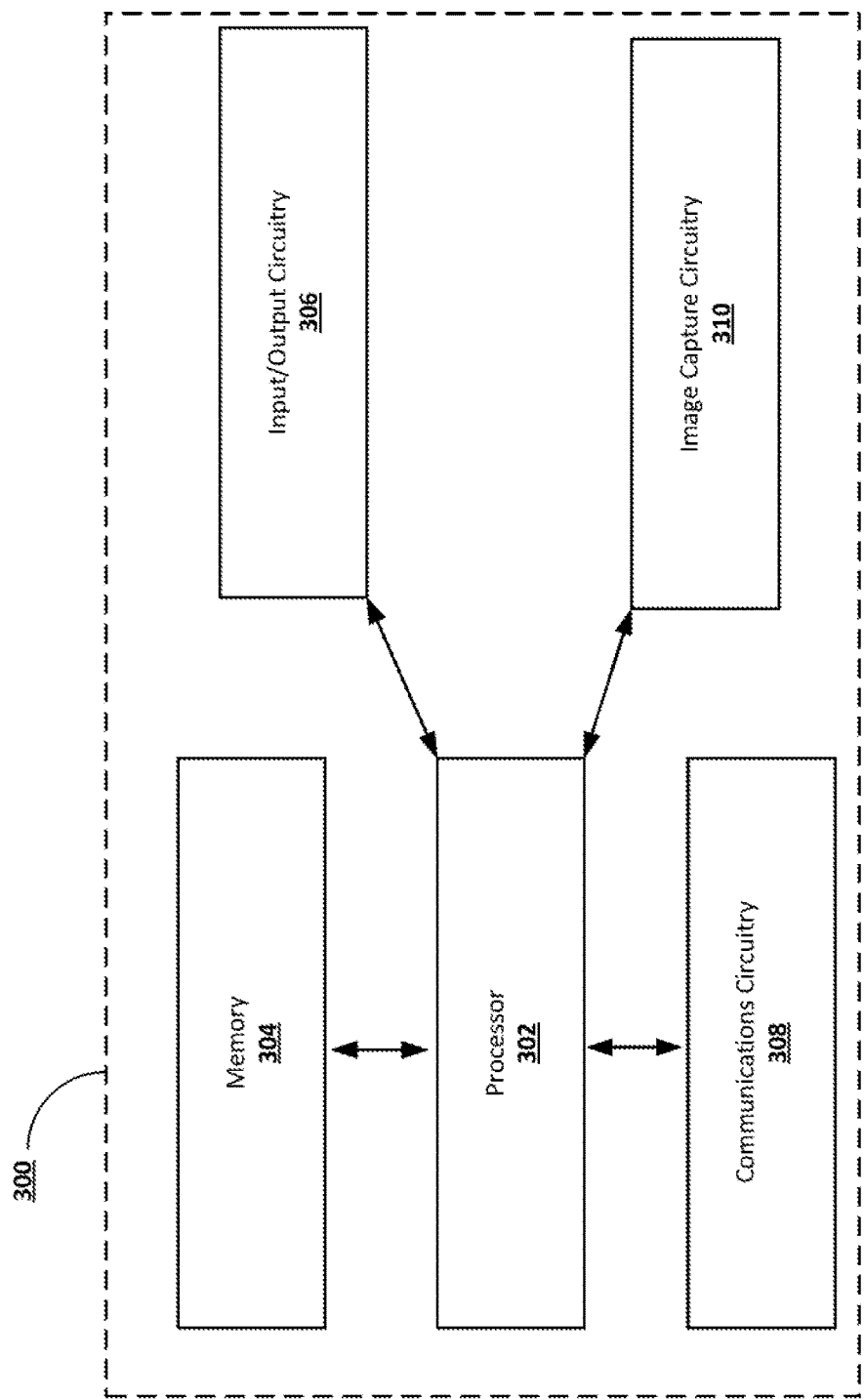
FIG. 3 is a block diagram of an example client computing device in accordance with at least some embodiments of the present invention.

Referring now to FIG. 3, the client computing device 102A-C may be embodied by one or more computing systems, such as apparatus 300 shown in FIG. 3. The apparatus 300 may include processor 302, memory 304, input/output circuitry 306, communications circuitry 308, and image capture circuitry 310. Although these components 302-310 are described with respect to functional limitations, it should be understood that the particular implementations necessarily include the use of particular hardware. It should also be understood that certain of these components 302-310 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like. In some embodiments, the input/output circuitry 306 may also include a keyboard (e.g., also referred to herein as keypad), a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

The image capture circuitry 310 may be any means such as a device or circuitry embodied in either hardware or a combination of hardware and software that is configured to capture images. The image capture circuitry may interact with one or more images. An example of an image capture circuitry 310 is an image sensor, such as a camera (e.g., a computing device camera). The image capture circuitry 310 may be configured to interact with the processor 302 via one or more instructions provided in a driver software associated with the image capture circuitry 310.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

To address the spoofing challenges of many conventional user authentication systems, various embodiments of the present invention describe techniques for performing illumination-based user authentication. For example, various embodiments of the present invention utilize data describing at least one of a reflection of a runtime-generated display pattern on a real-world physical entity (e.g., a real-world bodily entity such as a user's face or eyes) and a reaction of a recorded end-user to a run-time generated display pattern as predictive signals that can be used to predict whether a user authentication request originates from an authentic end user of a computing device or is otherwise a spoofed request. By utilizing illumination-based user authentication, various embodiments, of the present invention enable utilizing real-world illumination-based reflections of and end-user reactions to run-time generated display patterns in order to perform user authentication. Because the noted embodiments integrate real-world conditions generated by and real-world actions performed in response to dynamic outputs as authentication indicators, the mentioned embodiments provide an efficient yet powerful mechanism for defeating spoofed attempts at user authentication.

Accordingly, by utilizing various aspects via the illumination-based user authentication described herein, various embodiments of the present invention address technical challenges related to efficiency and reliability of user authentication systems. Moreover, by utilizing various aspects via the illumination-based user authentication described herein, various embodiments of the present invention increase efficiency and reliability of user authentication systems by enabling the computationally efficient and security-wise reliable counter-spoofing techniques related to illumination-based user authentication.

Figure 4:
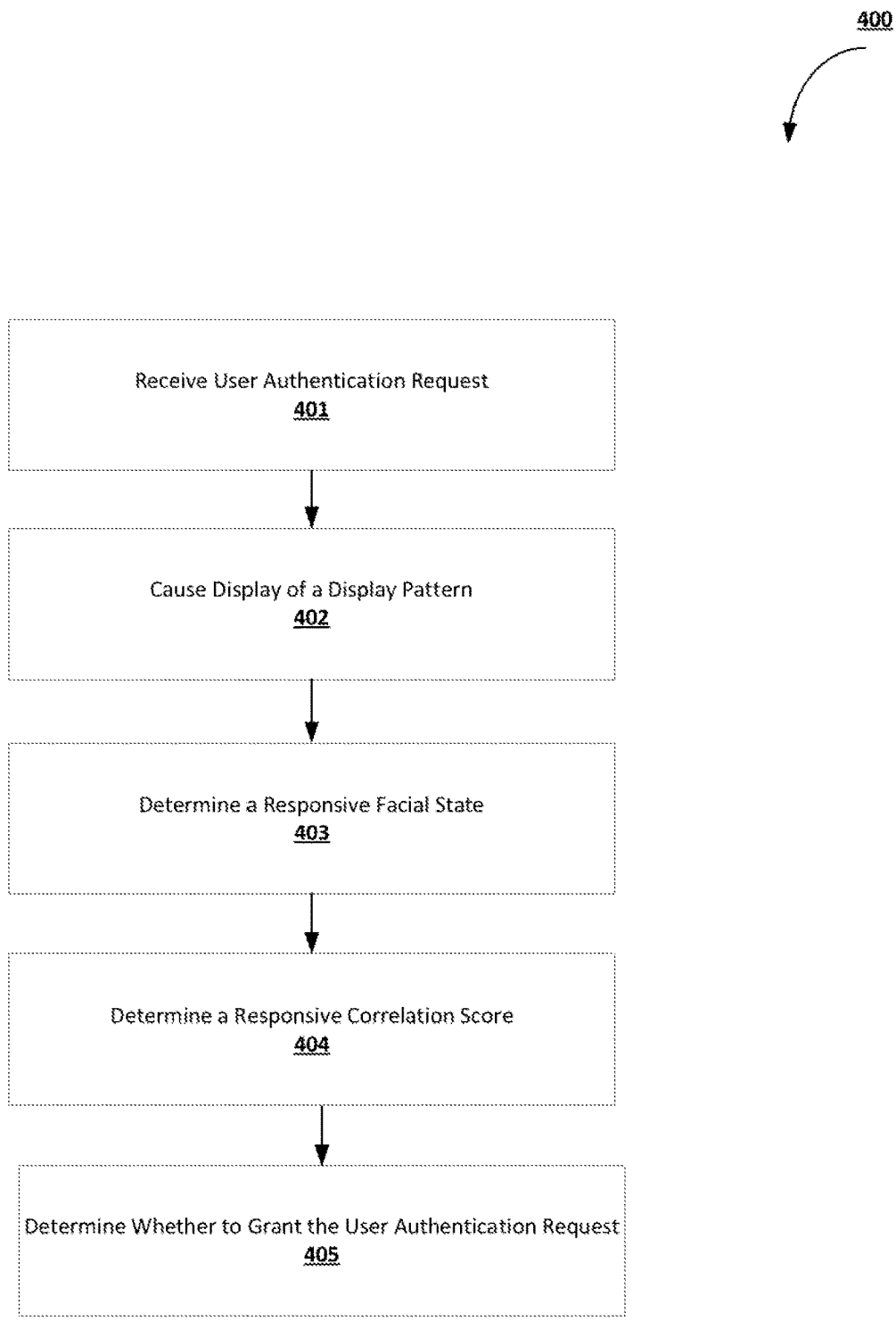
FIG. 4 is a flowchart diagram of an example process for illumination-based user authentication in accordance with at least some embodiments of the present invention.

FIG. 4 is a flowchart diagram of an example process 400 for performing illumination-based user authentication. Via the various operations of FIG. 4, the user authentication computing device 106 can efficiently and effectively perform user authentications that enable a high-level of protection against spoofed user authentication attempts.

The process 400 begins at operation 401 when the user authentication computing device 106 receives a user authentication request. In some embodiments, the user authentication request is a data object seeking to establish that a user profile associated with the data object is authorized to access corresponding computing resources associated with a computing device in accordance with predefined access rights defined for various user profiles of the computing device. An example of a user authentication request is a login request. User authentication request may be generated in response to predefined end-user actions with reference to a computing device utilized by the corresponding end-user. In some embodiments, a user authentication request is processed locally, i.e., on the same computing device as the computing device on which the user authentication request is generated. In some other embodiments, a user authentication request is transmitted, by the computing device on which the user authentication request is generated and via one or more computer networks, to another computing device configured to process the user authentication request.

At operation 402, the user authentication computing device 106 causes a display device of the user authentication computing device 106 to display a display pattern during a first time period. In some embodiments, the display pattern is a data object that describes, for each temporal instance of a time period (e.g., for each second of a time period including multiple seconds), one or more subsets of a display space of a display device of the user authentication computing device 106 along with a color designation for each subset of the one or more subsets. For example, a particular display pattern may describe that, during a first temporal instance of a first time period, a first set of pixels of a display space should have a first color designation and a second set of pixels of a display space should have a second color designation; during a second temporal instance of the first time period, a third set of pixels of a display space should have a third color designation and a fourth set of pixels of a display space should have the first color designation; and during a third temporal instance of the first time period, a fifth set of pixels of a display space should have the second color designation.

In some embodiments, a display pattern may be generated using at least one random selection routine and/or at least one pseudo-random selection routine. For example, a particular display pattern may be generated using a first random selection routine configured to select one or more random subsets of a display space and a second random selection routine configured to select a random color designation for each randomly-selected subset of the display space. As another example, a particular display pattern may be generated using a first pseudo-random selection routine configured to select one or more pseudo-random subsets of a display space and a second pseudo-random selection routine configured to select a pseudo-random color designation for each pseudo-randomly-selected subset of the display space.

In some embodiments, the user authentication computing device 106 randomly generates a display pattern for each time period in a selected subset of a consecutive sequence of time periods. Thereafter, the user authentication computing device 106 uses linear interpolation to generate display patterns for time periods in the consecutive sequence of time periods that are not in the selected subset. In some of the mentioned embodiments, the user authentication computing device 106 uses the noted linear interpolation operations to provide transitions between the randomly-generated display patterns for the time periods in the selected subset. In addition to reducing the need for performing computationally complex random number generation routines, using some or all of the techniques noted in this paragraph can lead to generating slow-paced transitions of display patterns across time periods in order to decrease triggering photosensitive epilepsy.

Figure 5:
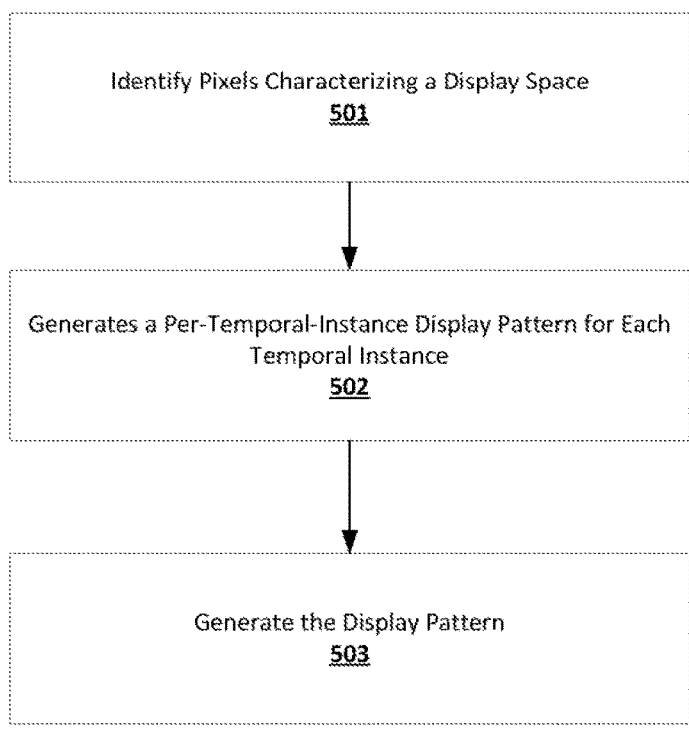
FIG. 5 is a flowchart diagram of an example process for generating a display pattern in accordance with at least some embodiments of the present invention.

In some embodiments, the user authentication computing device 106 generates the display pattern in accordance with the process 500 depicted in FIG. 5. As depicted in FIG. 5, the process 500 begins at operation 501 when the user authentication computing device 106 identifies a plurality of pixels characterizing a display space of the display device. At operation 502, for each temporal instance of a plurality of temporal instances in the first time period, the user authentication computing device 106 generates a per-temporal-instance display pattern for the temporal instance, where the per-temporal-instance display pattern for a corresponding temporal instance describes one or more pixels of the display space of a display device of the user authentication computing device 106 that will be used to display color patterns at the corresponding temporal instance along with a color designation for each subset of the one or more subsets. At operation 503, the user authentication computing device 106 generates the display pattern based on each per-temporal-instance display pattern for a temporal instance of a plurality of temporal instances in the first time period.

Figure 6:
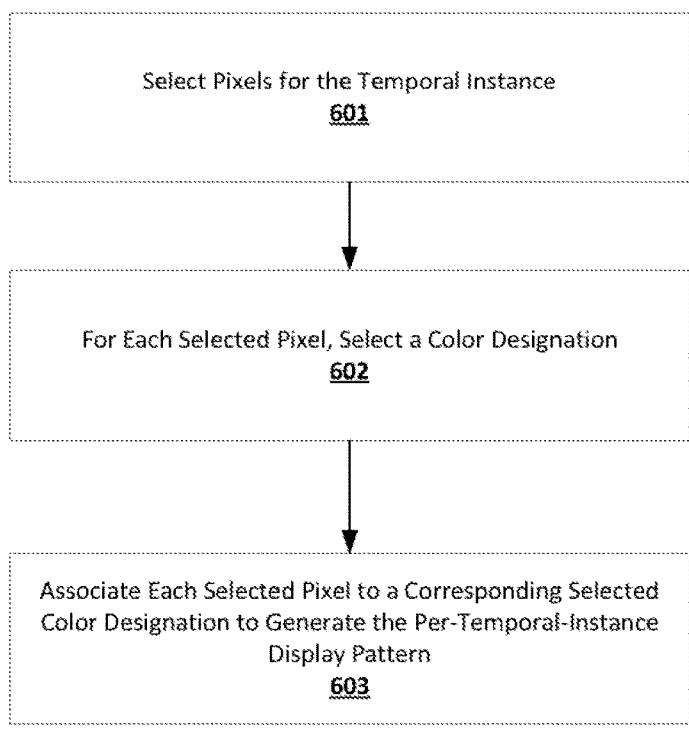
FIG. 6 is a flowchart diagram of an example process for generating a per-temporal-instance display pattern in accordance with at least some embodiments of the present invention.

In some embodiments, generating a per-temporal-instance display pattern for a particular temporal instance as described in operation 502 of FIG. 5 can be performed in accordance with the process 600 depicted in FIG. 6. As depicted in FIG. 6, process 600 begins at operation 601 when the user authentication computing device 106 selects, from the plurality of pixels characterizing a display space of the display device, one or more selected pixels for the particular temporal instance using a first pseudo-random selection. At operation 602, the user authentication computing device 106 selects, for each selected pixel of the one or more selected pixels for the particular temporal instance, a corresponding color designation of a plurality of color designations using a second pseudo-random selection. At operation 603, the user authentication computing device 106 associates each selected pixel of the one or more selected pixels for the temporal instance with the corresponding color designation for the selected pixel to generate the per-temporal-instance display pattern for the temporal instance. In some embodiments, a display pattern is always configured to occupy a fixed portion of the display space, e.g., a prominent fixed portion of the display space, such as the whole of the display space. In some embodiments, a display pattern is configured to occupy a changing portion of the display space.

An operational example of a display pattern 700 is presented in FIG. 7. As depicted in FIG. 7, the display pattern includes a first per-temporal-instance display pattern

701 for a first temporal instance T1, a second per-temporal-instance display pattern 702 for a second temporal instance T2, and a third per-temporal-instance display pattern 703 for a third temporal instance T3. The first per-temporal-instance display pattern 701 indicates that, at time T1, the square formed by the points (0,0), (0,1), (1,0), and (1,1) should have a color designation indicated by the RGB value of [255, 0, 0]. The second per-temporal-instance display pattern 702 indicates that, at time T2, the square formed by the points (1,1), (1,2), (2,1), and (2,2) should have a color designation indicated by the RGB value of [0,255, 0]. The third per-temporal-instance display pattern 703 indicates that, at time T3, the square formed by the points (2,2), (2,3), (3,2), and (3,3) should have a color designation indicated by the RGB value of [0,0, 255]. FIG. 8 provides an operational example of a display output 800 generated in accordance with the display pattern 700 of FIG. 7. As depicted in FIG. 8, the display output 800 will generates, at time T1, the red square 801; at time T2, the green square 802; and at time T3, the blue square 803.

In some embodiments, causing the display device of the user authentication computing device 106 to display the display pattern at the first time period comprises causing the display device to display the display pattern at a first subperiod within the first time period, where the first time period comprises the first subperiod and a responsive time period after the first temporal instance. In some embodiments, the responsive time period is an estimated time of reflection of a display pattern and/or an estimated time of reaction of an end-user to a display pattern. In some embodiments, the responsive time period of an end-user may be determined based on an average responsive behavioral profile of the end-user over time. In some embodiments, the responsive time period of an end-user may be determined based on an average responsive behavioral profile of an end-user cohort including the end-user.

In some embodiments, the responsive time period of an end-user may be determined based on an average responsive behavioral profile of all end-users. In some embodiments, the responsive behavioral profile is a data object that describes one or more expected properties of a physical reaction of an end-user to a display pattern. For example, a responsive behavioral profile may describe an expected speed of eye movement of an end-user in order to observe a particular display pattern. As another example, a responsive behavioral profile may describe an expected direction of eye movement of an end-user in order to observe a particular display pattern. As another example, a responsive behavioral profile may describe an expected magnitude of eye movement of an end-user in order to observe a particular display pattern.

Returning to FIG. 4, at operation 403, the user authentication computing device 106 determines, based on image sensor data received from an image sensor device of the user authentication computing device 106, a responsive facial state during the first time period. In some embodiments, the responsive facial state is a data object that describes one or more illumination-based reflections on an image region estimated to include a face of an end-user. A responsive facial state may describe, for each detected illumination-based reflection on an image region estimated to include a face of an end-user, a relative location of the illumination-based reflection in relation to other detected illumination-based reflections and/or in relation to the image region as a whole. In some embodiments, determining a responsive facial state for an end-user includes receiving image sensor data associated with the end-user, detecting an image region estimated to include a face of the end-user based on the image sensor data, and detecting one or more illumination-based reflections on the detected image region.

In some embodiments, the responsive facial state is a data object that describes one or more changes in an image region estimated to include a face of an end-user. For example, a responsive facial state may describe one or more eye ball movements of a recorded end-user of a computing device. In some embodiments, the responsive facial state is determined based on one or more responsive facial features of the end-user during the first time period. In some embodiments, a responsive facial feature is any data object that describes to a data object that describes one or more illumination-based reflections on an image region estimated to include a portion of a face of an end-user and/or one or more changes in an image region estimated to include a portion of a face of an end-user. An example of a responsive facial feature is an eye-related facial feature, which is a data object that describes one or more changes in an image region estimated to include one or both of the eyes of an end-user. For example, an eye-related facial feature may describe at least one of a direction of eye movement of an end-user, a magnitude of eye movement of an end-user, a speed of direction of eye movement of an end-user, etc.

An operational example of a vision-based responsive facial state 900 is presented in FIG. 9. The vision-based responsive facial state 900 depicts, for each temporal instance of the three temporal instances of a corresponding time period, a positional value and a color value, where the positional value of a temporal instance may indicate position of the eyeball of the end-user at the time temporal instance and the color value of a temporal instance indicates an inferred reflected color of the eyeball of the end-user at the temporal instance. In some embodiments, the positional value of a temporal instance indicates polar coordinates of the eyeball of the end-user at the corresponding temporal instance, where the polar coordinates may be calculated by mapping the central point of the eyeball of the end-user using the eyeball positioning modeling data object 1000 of FIG. 10. As depicted in FIG. 9, temporal instance T1 is associated with the positional value $(1, \pi/2)$ and color value of [255, 3, 4]; temporal instance T2 is associated with the positional value $(0.8, 3\pi/2)$ and color value of [3, 255, 4]; and temporal instance T3 is associated with the positional value $(1, 4\pi/2)$ and color value of [3, 3, 4].

Returning to FIG. 4, at operation 404, the user authentication computing device 106 determines a responsive correlation score for the display pattern and the responsive facial state, where the reflective correlation score is an estimated likelihood that that the responsive facial state indicates an authenticated end-user observing the display pattern. In some embodiments, a responsive correlation score is determined as a measure of deviation between a responsive facial state and an expected responsive facial state for a display pattern.

In some embodiments, a responsive correlation score is determined as a measure of a count of illumination-based reflections described by a corresponding responsive facial state that each correlates with a color designation of a corresponding display pattern. In some embodiments, a responsive correlation score is determined as a measure of a weighted count of illumination-based reflections described by a corresponding responsive facial state that each correlates with a color designation of a corresponding display pattern, where the weight of each correlation is determined based on at least one of a size of the display space subset corresponding to a color designation associated with the correlation, a brightness of a color designation associated with the correlation, etc.

In some embodiments, a responsive correlation score is determined as a measure of count of one or more eye movements described by a corresponding responsive facial state that each correlates with a color designation of a corresponding display pattern. In some embodiments, a responsive correlation score is determined as a weighted measure of count of eye movements described by a corresponding responsive facial state that each correlates with a color designation of a corresponding display pattern, where the weight of each correlation is determined based on at least one of a size of the display space subset corresponding to a color designation associated with the correlation, a brightness of a color designation associated with the correlation, etc.

In some embodiments, determining a responsive correlation score for the display pattern and the responsive facial state can be performed in accordance with the process 1100 depicted in FIG. 11. As depicted in FIG. 11, the process 1100 begins at operation 1101 when user authentication computing device 106 identifies a plurality of temporal instances (e.g., a plurality of seconds, a plurality of milliseconds, a plurality of combinations of milliseconds etc.) associated with the first time period. At operation 1102, the user authentication computing device 106 determines a per-temporal-instance responsive correlation score for each temporal instance of the identified plurality of temporal instances. At operation 1103, the user authentication computing device 106 determines a responsive correlation score for the display pattern and the responsive facial state based on each per-temporal-instance responsive correlation score for a temporal instance of the identified plurality of temporal instances.

In some embodiments, to determine a per-temporal-instance responsive correlation score for a temporal instance at operation 1102, the user authentication computing device 106 performs operations of the process 1200 depicted in FIG. 12. As depicted in FIG. 12, the process 1200 begins at operation 1201 when the user authentication computing device 106 determines a per-temporal instance of the display pattern at the temporal instance. In some embodiments, to determine the temporal instance of the display pattern at the temporal instance, the user authentication computing device 106 determines a portion of the display pattern displayed and/or configured to be displayed at the temporal instance (e.g., a snapshot of the display pattern associated with the temporal instance).

At operation 1202, the user authentication computing device 106 identifies a reactive temporal instance of the plurality of temporal instances for the temporal instance, wherein the reactive temporal instance for the temporal instance has a temporal distance from the temporal instance that corresponds to a responsive time period. In some embodiments, a responsive time period is estimated time of reflection of a display pattern and/or an estimated time of reaction of an end-user to a display pattern. In some embodiments, the responsive time period may be determined based on at least one of an estimated reflection speed of a display device used to display the display pattern and a measure of responsive behavioral profile of the end-user. In some embodiments, to identify the reactive temporal instance for a particular temporal instance, the user authentication computing device 106 identifies a second temporal instance that is n temporal instances subsequent to the particular instance, where n is a universal responsive time period or a per-temporal-instance responsive time period associated with the particular temporal inference.

At operation 1203, the user authentication computing device 106 determines a reactive subset of the responsive facial state for the temporal instance, where the reactive subset comprises a portion of the responsive facial state determined based on the image sensor data whose timestamp corresponds to the reactive temporal instance. In some embodiments, to determine the reactive subset of the responsive facial state for the temporal instance, the user authentication computing device 106 utilizes a portion of the responsive facial state that is generated based on image sensor data captured at the time of the reactive temporal instance. In some embodiments, to determine the reactive subset of the responsive facial state for the temporal instance, the user authentication computing device 106 utilizes a portion of the responsive facial state that is generated based on image sensor data whose respective timestamps indicate and/or suggest that the noted image sensor data are captured at the time of the reactive temporal instance.

At operation 1204, the user authentication computing device 106 determines the per-temporal-instance responsive correlation score for the temporal instance based on a measure of deviation of the per-temporal-instance display pattern for the temporal instance from the reactive subset for the temporal instance. In some embodiments, to determine the measure of deviation of the per-temporal-instance display pattern from the reactive subset, the user authentication computing device 106 converts the positional values associated with the per-temporal-instance display pattern for the temporal instance and the reactive subset for the temporal instance into a common coordinate system. For example, if one of the per-temporal-instance display pattern for the temporal instance and the reactive subset for the temporal instance has its positional values expressed as cartesian coordinates and the other has its positional values expressed in polar coordinates, the user authentication computing device 106 may convert both positional values into one of cartesian coordinates and polar coordinates.

Returning to FIG. 4, at operation 405, the user authentication computing device 106 determines whether to grant the user authentication request based on one or more authentication indicators, wherein the one or more authentication indicators comprise the responsive correlation score. In some embodiments, the one or more authentication indicators comprise a lip synchronization correlation score. In some of those embodiments, determining the lip synchronization correlation score comprises determining, based on second image sensor data received from an image sensor device of the computing device, a lip synchronization state of the authenticated end-user at a second time period; and determining the lip synchronization correlation score based on a second estimated likelihood that the lip synchronization state corresponds to an expected lip synchronization state.

While various embodiments of the present invention describe the lip-synchronization-based user authentication techniques introduced herein as supplementing the illumination-based user authentication techniques, a person of ordinary skill in the relevant technology will recognize that either of the lip-synchronization-based user authentication techniques and the illumination-based user authentication techniques can be utilized independent of the other. Moreover, in some embodiments, one of the of the lip-synchronization-based user authentication techniques and the illumination-based user authentication techniques is utilized as a secondary authentication method along with the other or as an alternative authentication method for the other.

In some embodiments, performing lip-synchronization-based user authentication can be performed in accordance with the process 1300 as depicted in FIG. 13. As depicted in FIG. 13, the process 1300 begins at operation 1301 when the user authentication computing device 106 receives a user authentication request associated with a user profile. At operation 1302, the user authentication computing device 106 determines an authentication token (e.g., a password authentication token) associated with the user profile that is associated with the user authentication request.

At operation 1303, the user authentication computing device 106 determines an expected lip-synchronization state for the authentication token. In some embodiments, the user authentication computing device 106 may determine the expected lip-synchronization state for the authentication token based on a lip movement profile of the user profile. In some embodiments, the user authentication computing device 106 may determine the expected lip-synchronization state for the authentication token using a generative machine learning model, such as an autoencoder generative machine learning model. In some embodiments, the generative machine learning model may be used to generate a lip movement profile of the user profile.

At operation 1304, the user authentication computing device 106 displays a request for utterance of the authentication token. At operation 1305, the user authentication computing device 106 determines a lip-synchronization state of an end-user based on image sensor data whose timestamp indicates that they are recorded at a responsive time interval after a time of display of the request for utterance of the authentication.

In some embodiments, the user authentication computing device 106 receives a sequence of images and/or videos that contain lip movements of an end-user. Afterward, the user authentication computing device 106 utilizes an image processing model (e.g., an image processing model including a trained convolutional neural network) configured to convert sequences of images and/or videos into phonetic symbols (e.g., phonetic symbols corresponding to a language agnostic system of phonetic symbols such as the International Phonetic Alphabet system of symbols) in order to convert the received sequence of images and/or videos into phonetic symbols. The user authentication computing device 106 may then generate the lip-synchronization state of the end-user based on the generated phonetic symbols.

At operation 1306, the user authentication computing device 106 determines a measure of deviation of the lip-synchronization state determined at operation 1305 and the expected lip-synchronization state determined at operation 1303. In some embodiments, when the lip-synchronization state is indicative of one or more first phonetic symbols derived from a sequence of images and/videos deemed to include lip movements of an end-user, the user authentication computing device 106 determines the measure of deviation by comparing the one or more first phonetic symbols and one or more second phonetic symbols associated with an authentication token (e.g., comparing the one or more first phonetic symbols and the one or more second phonetic symbols in accordance with phonetic symbol similarity data that indicate, for each pair of two phonetic symbols, an inter-symbol phonetic similarity score).

At operation 1307, the user authentication computing device 106 determines an authentication indicator based on whether the measure of deviation of the lip-synchronization state determined at operation 1305 and the expected lip-synchronization state determined at operation 1303 satisfies one or more lip-synchronization threshold criteria, e.g., exceeds a lip-synchronization threshold value. In some embodiments, if the user authentication computing device 106 determines that the measure of deviation of the lip-synchronization state determined at operation 1305 and the expected lip-synchronization state determined at operation 1303 satisfies the one or more lip-synchronization threshold criteria, the user authentication computing device 106 determines a positive authentication indicator indicating successful authentication of the end user. In some embodiments, if the user authentication computing device 106 determines that the measure of deviation of the lip-synchronization state determined at operation 1305 and the expected lip-synchronization state determined at operation 1303 fails to satisfy the one or more lip-synchronization threshold criteria, the user authentication computing device 106 determines a negative authentication indicator indicating an unsuccessful authentication of the end user.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., a Hypertext Markup Language (HTML) page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for illumination-based user authentication, the apparatus comprising at least one processor and at least one memory including program code, the at least one memory and the program code configured to, with the processor, cause the apparatus to at least:
receive a user authentication request from a user for a computing device,
and in response to receiving the user authentication request,
cause a display device of the computing device to display a display pattern comprising a series of displayed images during a first time period comprising a plurality of temporal instances,
wherein for each of the plurality of temporal in stances, a different one of the series of displayed images is displayed on the display device,
wherein each of the different one of the series of displayed images corresponds to a defined combination of Red-Green-Blue (RGB) color and position on the display,
determine, based on image sensor data received from an image sensor device of the computing device, a plurality of responsive eye states each corresponding to respective ones of the plurality of temporal instances of the first time period;
wherein each of the plurality of responsive eye states includes one or more pairs, each pair comprising a user eye location and a corresponding RGB value measured at the user eye location,
wherein each of the corresponding RGB values are reflections caused by interactions between the display pattern with a user eye at the user eye location,
determine a responsive correlation scorer by:
for the each of the plurality of temporal instances,
retrieving a corresponding displayed image from the series of displayed images,
retrieving an expected pair comprising an expected user eye location and an expected RGB value based at least on the corresponding displayed image, the user, and at least one of a database or a predictive model,
using the expected user eye location, identify at least one of the one or more pairs having an associated user eye location correlating to the expected user eye location, and
comparing an associated RGB value of the identified at least one of the one or more pairs to the expected RGB value,
and determine whether to grant the user authentication request based on the responsive correlation score.

2. The apparatus of claim 1, wherein generating the display pattern comprises:
identifying a plurality of pixels characterizing a display space of the display device;
for each temporal instance of the plurality of temporal instances in the first time period,
selecting, from the plurality of pixels, one or more selected pixels for a temporal instance using a first pseudo-random selection;
selecting, for each selected pixel of the one or more selected pixels for the temporal instance, a corresponding color designation of a plurality of color designations using a second pseudo-random selection; and
associating each selected pixel of the one or more selected pixels for the temporal instance with the corresponding color designation for the selected pixel to generate a per-temporal-instance display pattern for the temporal instance; and
generating the display pattern based on each per-temporal-instance display pattern for each temporal instance of the plurality of temporal instances in the first time period.

3. The apparatus of claim 1, wherein:
causing the display device of the computing device to display the display pattern at the first time period comprises causing the display device to display the display pattern at a first subperiod within the first time period; and
the first time period comprises the first subperiod and a responsive time period after a first temporal instance.

4. The apparatus of claim 3, wherein the responsive time period is selected based on a responsive behavioral profile of the user.

5. The apparatus of claim 3, wherein the responsive time period is selected based on a responsive behavioral profile of an average end user.

6. The apparatus of claim 1, wherein determining the responsive eye state of the user comprises:
detecting, based on the image data, one or more responsive eye-related facial features of the user; and
determining the responsive eye state based on the one or more responsive eye-related facial features.

7. The apparatus of claim 1, wherein:
the responsive correlation score further comprises a lip synchronization correlation score; and
determining the lip synchronization correlation score comprises:
determining, based on second image sensor data received from an image sensor device of the computing device, a lip synchronization state of the user at a second time period; and
determining the lip synchronization correlation score based on a second estimated likelihood that the lip synchronization state corresponds to an expected lip synchronization state, wherein the expected lip synchronization state is determined using a generative machine learning model.

8. The apparatus of claim 7, wherein the expected lip synchronization state comprises expected lip movements while uttering an authentication token.

9. The apparatus of claim 8, wherein the authentication token is a preconfigured password of a user account associated with the user authentication request.

10. The apparatus of claim 1, wherein determining the responsive correlation score for the display pattern and the responsive eye state comprises:
for each temporal instance of the plurality of temporal instances of the first time period,
determining a per-temporal-instance display pattern of the display pattern at a temporal instance;
identifying a reactive temporal instance of the plurality of temporal instances for the temporal instance, wherein the reactive temporal instance for the temporal instance has a temporal distance from the temporal instance that corresponds to a responsive time period;
determining a reactive subset of the responsive eye state for the temporal instance, wherein the reactive subset comprises a portion of the responsive eye state determined based on the image sensor data whose timestamp corresponds to the reactive temporal instance; and
determining a per-temporal-instance responsive correlation score for the temporal instance based on a measure of deviation of the per-temporal-instance display pattern from the reactive subset; and
determining the responsive correlation score based on each per-temporal-instance responsive correlation score for each temporal instance of the plurality of temporal instances.

11. The apparatus of claim 1, whether the display pattern is a pseudo-random generated display pattern.

12. A computer-implemented method for illumination-based user authentication, the computer-implemented method comprising:
receiving a user authentication request from a user for a computing device,
and in response to receiving the user authentication request,
causing a display device of the computing dev ice to display a display pattern comprising a series of displayed images during a first time period comprising a plurality of temporal instances,
wherein for each of the plurality of temporal in stances, a different one of the series of displayed images is displayed on the display device,
wherein each of the different one of the series of displayed images corresponds to a defined combination of Red-Green-Blue (RGB) color and position on the display,
determining, based on image sensor data received from an image sensor device of the computing device, a plurality of responsive eye states, each corresponding to respective ones of the plurality of temporal instances of the first time period;
wherein each of the plurality of responsive eye states includes one or more pairs,
each pair comprising a user eye location and a corresponding RGB value measured at the user eye location,
wherein each of the corresponding RGB values are reflections caused by interactions between the display pattern with a user eye at the user eye location,
determining a responsive correlation score by:
for the each of the plurality of temporal instances,
retrieving a corresponding displayed image from the series of displayed images,
retrieving an expected pair comprising an expected user eye location and
an expected RGB value based at least on the corresponding displayed image, the user, and at least one of a database or a predictive model,
using the expected user eye location, identify at least one of the one or more pairs having an associated user eye location correlating to the expected user eye location, and
comparing an associated RGB value of the identified at least one of the one or more pairs to the expected RGB value,
and determining whether to grant the user authentication request based on the responsive correlation score.

13. The computer-implemented method of claim 12, wherein generating the display pattern comprises:
identifying a plurality of pixels characterizing a display space of the display device;
for each temporal instance of the plurality of temporal instances in the first time period,
selecting, from the plurality of pixels, one or more selected pixels for a temporal instance using a first pseudo-random selection;
selecting, for each selected pixel of the one or more selected pixels for the temporal instance, a corresponding color designation of a plurality of color designations using a second pseudo-random selection; and
associating each selected pixel of the one or more selected pixels for the temporal instance with the corresponding color designation for the selected pixel to generate a per-temporal-instance display pattern for the temporal instance; and
generating the display pattern based on each per-temporal-instance display pattern for each temporal instance of the plurality of temporal instances in the first time period.

14. The computer-implemented method of claim 12, wherein:
causing the display device of the computing device to display the display pattern at the first time period comprises causing the display device to display the display pattern at a first subperiod within the first time period; and
the first time period comprises the first subperiod and a responsive time period after a first temporal instance.

15. The computer-implemented method of claim 12, wherein determining the responsive eye state of the user comprises:
detecting, based on the image data, one or more responsive eye-related facial features of the user; and
determining the responsive eye state based on the one or more responsive eye-related facial features.

16. The computer-implemented method of claim 12, wherein:
the responsive correlation score further comprises a lip synchronization correlation score; and
determining the lip synchronization correlation score comprises:

determining, based on second image sensor data received from an image sensor device of the computing device, a lip synchronization state of the user at a second time period; and determining the lip synchronization correlation score based on a second estimated likelihood that the lip synchronization state corresponds to an expected lip synchronization state, wherein the expected lip synchronization state is determined using a generative machine learning model.

17. The computer-implemented method of claim 12, wherein determining the responsive correlation score for the display pattern and the responsive eye state comprises:

for each temporal instance of a plurality of temporal instances of the first time period,
determining a per-temporal-instance display pattern of the display pattern at a temporal instance;
identifying a reactive temporal instance of the plurality of temporal instances for the temporal instance, wherein the reactive temporal instance for the temporal instance has a temporal distance from the temporal instance that corresponds to a responsive time period;
determining a reactive subset of the responsive eye state for the temporal instance, wherein the reactive subset comprises a portion of the responsive eye state determined based on the image sensor data whose timestamp corresponds to the reactive temporal instance; and
determining a per-temporal-instance responsive correlation score for the temporal instance based on a measure of deviation of the per-temporal-instance display pattern from the reactive subset; and
determining the responsive correlation score based on each per-temporal-instance responsive correlation score for each temporal instance of the plurality of temporal instances.

18. The computer-implemented method of claim 12, wherein the display pattern is a pseudo-random-generated display pattern.

19. A computer program product for illumination-based user authentication the computer program product comprising at least one non-transitory computer-readable storage medium having computer-readable program code portions stored therein, the computer-readable program code portions configured to:

receive a user authentication request from a user for a computing device,
and in response to receiving the user authentication request,
cause a display device of the computing device to display a display pattern comprising a series of displayed images during a first time period comprising a plurality of temporal instances,
wherein for each of the plurality of temporal in stances, a different one of the series of displayed images is displayed on the display device,
wherein each of the different one of the series of displayed images corresponds to a defined combination of Red-Green-Blue (RGB) color and position on the display, determine, based on image sensor data received from an image sensor device of the computing device, a plurality of responsive eye states, each corresponding to respective ones of the plurality of temporal instances of the first time period;
wherein each of the plurality of responsive eye states includes one or more pairs, each pair comprising a user eye location and a corresponding RGB value measured at the user eye location,
wherein each of the corresponding RGB values are reflections caused by interactions between the display pattern with a user eye at the user eye location,
determine a responsive correlation score by:
for the each of the plurality of temporal instances,
retrieving a corresponding displayed image from the series of displayed images,
retrieving an expected pair comprising an expected user eye location and an expected RGB value based at least on the corresponding displayed image, the user, and at least one of a database or a predictive model,
using the expected user eye location, identify at least one of the one or more pairs having an associated user eye location correlating to the expected user eye location, and
comparing an associated RGB value of the identified at least one of the one or more pairs to the expected RGB value,
and determine whether to grant the user authentication request based on the responsive correlation score.

20. The computer program product of claim 19, wherein determining the responsive correlation score for the display pattern and the responsive eye state comprises:

for each temporal instance of the plurality of temporal instances of the first time period,
determining a per-temporal-instance display pattern of the display pattern at a temporal instance;
identifying a reactive temporal instance of the plurality of temporal instances for the temporal instance, wherein the reactive temporal instance for the temporal instance has a temporal distance from the temporal instance that corresponds to a responsive time period;
determining a reactive subset of the responsive eye state for the temporal instance, wherein the reactive subset comprises a portion of the responsive eye state determined based on the image sensor data whose timestamp corresponds to the reactive temporal instance; and
determining a per-temporal-instance responsive correlation score for the temporal instance based on a measure of deviation of the per-temporal-instance display pattern from the reactive subset; and
determining the responsive correlation score based on each per-temporal-instance responsive correlation score for each temporal instance of the plurality of temporal instances.

* * * * *

UNITED STATES PATENT AND TRADEMARK OFFICE
CERTIFICATE OF CORRECTION

Page 1 of 1

PATENT NO. : 11,983,256 B2
APPLICATION NO. : 17/123933
DATED : May 14, 2024
INVENTOR(S) : Li

It is certified that error appears in the above-identified patent and that said Letters Patent is hereby corrected as shown below:

In the Claims

Column 23,
Line 43, "in stances," should read --instances,--;
Line 52, "states each" should read --states, each--;
Line 62, "scorer" should read --score--.

Column 25,
Line 47, "dev ice" should read --device--;
Line 51, "in stances," should read --instances,--.

Column 27,
Line 55, "in stances," should read --instances,--.

Signed and Sealed this
Eleventh Day of March, 2025

Coke Morgan Stewart
*Acting Director of the United States Patent and Trademark Office*